US00RE48107E

(19) United States
(12) Reissued Patent
Li et al.

(10) Patent Number: US RE48,107 E
(45) Date of Reissued Patent: Jul. 21, 2020

(54) MULTICOLOR ILLUMINATION DEVICE USING MOVING PLATE WITH WAVELENGTH CONVERSION MATERIALS

(71) Applicant: APPOTRONICS CORPORATION LIMITED, Shenzhen (CN)

(72) Inventors: Yi Li, Pleasanton, CA (US); Li Xu, Saratoga, CA (US)

(73) Assignee: Appotronics Corporation Limited, Shenzhen (CN)

(21) Appl. No.: 15/088,548

(22) Filed: Apr. 1, 2016

Related U.S. Patent Documents

Reissue of:
(64) Patent No.: 7,547,114
Issued: Jun. 16, 2009
Appl. No.: 11/830,311
Filed: Jul. 30, 2007

(51) Int. Cl.
*G03B 21/20* (2006.01)
*H05B 45/20* (2020.01)
(Continued)

(52) U.S. Cl.
CPC ..... *G03B 21/204* (2013.01); *G03B 21/2066* (2013.01); *H04N 9/315* (2013.01);
(Continued)

(58) Field of Classification Search
CPC .. G03B 21/204; G03B 21/2066; G03B 33/06; H04N 9/315; H04N 9/3161; F21S 10/005;
(Continued)

(56) References Cited

U.S. PATENT DOCUMENTS 1,361,380 A 12/1920 Gay
4,127,322 A * 11/1978 Jacobson ..... H04N 9/3105 348/761
(Continued)

FOREIGN PATENT DOCUMENTS

CN 1404699 A 3/2003
CN 1434287 A 8/2003
(Continued)

OTHER PUBLICATIONS

Nichia, Application Note : Controlling Luminous Intensity of LEDs, Apr. 15, 2004. Down loaded from https://web.archive.org/web/20130124034818/http://www.nichia.co.jp:80/specification/en/product/led/controlling.pdf.*
(Continued)

*Primary Examiner* — Albert J Gagliardi
(74) *Attorney, Agent, or Firm* — Morgan, Lewis & Bockius LLP

(57) ABSTRACT

A multicolor illumination device using an excitation light source and a multi-segmented moving plate with wavelength conversion materials (e.g. phosphors) is disclosed. The exciting light source is a light emitting diode or a laser diode emitting in the UV and/or blue region. The wavelength conversion materials absorb the excitation light and emit longer wavelength light. Each segment of the moving plate contains a different wavelength conversion material or no wavelength conversion material. The plate is supported to move so that different segments are exposed to the excitation light at different times. The plate may be a wheel or rectangular in shape and rotates or oscillates linearly. When the plate moves, light of different colors is generated sequentially in time by the different wavelength conversion materials in different segments of the plate. The multicolor illumination device may be used in a projector system having a microdisplay imager for image display.

9 Claims, 12 Drawing Sheets

(51) Int. Cl.

| | |
|---|---|
| ***H04N 9/31*** | (2006.01) |
| ***F21V 17/04*** | (2006.01) |
| ***F21S 10/02*** | (2006.01) |
| *F21V 7/00* | (2006.01) |
| *F21S 10/00* | (2006.01) |
| *F21Y 115/10* | (2016.01) |
| *F21Y 115/30* | (2016.01) |

(52) U.S. Cl.
CPC ..... *H04N 9/3161* (2013.01); *H05B 45/20* (2020.01); *F21S 10/005* (2013.01); *F21S 10/007* (2013.01); *F21S 10/02* (2013.01); *F21V 7/0025* (2013.01); *F21V 17/04* (2013.01); *F21Y 2115/10* (2016.08); *F21Y 2115/30* (2016.08)

(58) Field of Classification Search
CPC ..... F21S 10/007; F21S 10/02; F21V 17/04; F21V 7/0025; F21Y 2115/30; F21Y 2115/10
USPC ..... 362/231, 554, 84, 284, 293, 324, 555, 362/583; 353/20, 31
See application file for complete search history.

(56) References Cited

U.S. PATENT DOCUMENTS

| | | | | |
|---|---|---|---|---|
| 5,706,061 | A | 1/1998 | Marshall et al. | |
| 6,028,694 | A | 2/2000 | Schmidt | |
| 6,088,067 | A | 7/2000 | Willett et al. | |
| 6,111,696 | A | 8/2000 | Allen et al. | |
| 6,224,216 | B1 | 5/2001 | Parker et al. | |
| 6,646,636 | B1 | 11/2003 | Popovich et al. | |
| 6,769,773 | B1 | 8/2004 | Wu | |
| 7,001,022 | B2 * | 2/2006 | Kim et al. | 353/31 |
| 7,048,385 | B2 * | 5/2006 | Beeson et al. | 353/97 |
| 7,070,300 | B2 * | 7/2006 | Harbers et al. | G02B 27/1046 257/E33.071 |
| 7,318,651 | B2 | 1/2008 | Chua et al. | |
| 7,423,802 | B2 * | 9/2008 | Miller | G02B 6/12019 359/326 |
| 7,445,340 | B2 * | 11/2008 | Conner et al. | 353/20 |
| 7,651,243 | B2 | 1/2010 | McGuire, Jr. et al. | |
| 2004/0004675 | A1 | 1/2004 | Honda | |
| 2004/0075817 | A1 | 4/2004 | Agostinelli et al. | |
| 2005/0041000 | A1 | 2/2005 | Plut | |
| 2005/0116635 | A1 | 6/2005 | Walson et al. | |
| 2005/0224826 | A1 | 10/2005 | Keuper et al. | |
| 2005/0265029 | A1 | 12/2005 | Epstein et al. | |
| 2005/0270775 | A1 | 12/2005 | Harbers et al. | |
| 2006/0227302 | A1 | 10/2006 | Harbers et al. | |
| 2006/0262514 | A1 | 11/2006 | Conner et al. | |
| 2007/0019408 | A1 | 1/2007 | McGuire, Jr. et al. | F21S 10/007 362/231 |
| 2007/0053184 | A1 | 3/2007 | Brukilacchio | |
| 2007/0053186 | A1 | 3/2007 | Reel et al. | |
| 2007/0081336 | A1 | 4/2007 | Bierhuizen et al. | |
| 2007/0146639 | A1 | 6/2007 | Conner | |
| 2009/0187234 | A1 * | 7/2009 | Meyer | C09K 11/06 607/88 |

FOREIGN PATENT DOCUMENTS

| | | | |
|---|---|---|---|
| CN | 1469191 | A | 1/2004 |
| CN | 2754120 | Y | 1/2006 |
| CN | 1841487 | A | 10/2006 |
| CN | 1902519 | A | 1/2007 |
| CN | 101000458 | A | 7/2007 |
| EP | 1605199 | | 12/2005 |
| JP | 20040325874 | A | 11/2004 |
| JP | 20040341105 | A | 12/2004 |
| KR | 2007-0008852 | A | 1/2007 |
| TW | 200604466 | A | 2/2006 |
| TW | 200728660 | A | 8/2007 |
| WO | 02/080136 | A1 | 10/2002 |
| WO | 2006/035388 | A2 | 4/2006 |
| WO | 2006/102846 | A1 | 10/2006 |
| WO | 2007/082021 | A2 | 7/2007 |

OTHER PUBLICATIONS

Nichia, Application Note : Balancing White color , Aug. 1, 2004. Down loaded from https://web.archive.org/web/20110927015743/http://www.nichia.co.jp/specification/en/product/led/whitebalance.pdf.*

Examination Decision on Request for Invalidation issued in counterpart Chinese Patent Application No. 200880107739.5 dated Mar. 18, 2019 (concise statement of relevance filed herewith).

Examination Decision on Request for Invalidation issued in counterpart Chinese Patent Application No. 200880107739.5 dated Mar. 4, 2015 (concise statement of relevance filed herewith).

First Examination Report issued in counterpart European Patent Application No. 17193957.2 dated Jul. 25, 2019.

International Search report and Written Opinion in counterpart PCT application No. PCT/US2008/070555, dated Sep. 22, 2008.

* cited by examiner

MULTICOLOR ILLUMINATION DEVICE USING MOVING PLATE WITH WAVELENGTH CONVERSION MATERIALS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*The present application is a reissue of U.S. Pat. No. 7,547,114. More than one reissue application has been filed for the reissue of U.S. Pat. No. 7,547,114. The reissue applications are U.S. application Ser. Nos. 15/088,548 (the present application) and 15/365,871, both of which are reissues of U.S. Pat. No. 7,547,114. U.S. application Ser. No. 15/365,871 is a continuation reissue of U.S. application Ser. No. 15/088,548 (the present application).*

BACKGROUND OF THE INVENTION

1. Field of the Invention

This invention relates to lighting devices and systems, and in particular, it relates to devices for generating high brightness multicolor light using wavelength conversion.

2. Description of the Related Art

Wavelength conversion methods that use excitation light produced by solid-state light source such as laser diodes (LDs) or light emitting diodes (LEDs) and wavelength conversion materials such as phosphors or quantum dots can produce high brightness light at wavelengths different from the wavelength of the excitation light. In conventional devices, excitation light impinges on a wavelength conversion material, which absorbs the excitation light and emits light at a wavelength higher than the wavelength of the excitation light. To generate light of different colors, different wavelength conversion materials are typically employed. In a projection system described in commonly owned International Patent Application Publication No. WO 2006/102846 A1 published Oct. 5, 2006, three LED light sources are used to generate red, green and blue light, respectively (see FIG. 15 therein). The light of different colors are directed to a dichroic cross-prism which combine the light beams and direct them to a light modulator, which may be a MEMS (micro electronic mechanical system) device or a liquid crystal device (LCD or LCoS). The LED light sources and the light modulator are controlled in a synchronized manner by a signal processor to produce an image.

In some conventional multicolor illumination devices, a white light source (such as a high pressure mercury lamp) is used in conjunction with a color wheel to generate color lights with controlled time sequences. The color wheel, which is disposed in front of the white light source, is made of multiple color filters each transmitting light of a particular color.

SUMMARY OF THE INVENTION

The present invention is directed to an illumination device for generating multicolor light using wavelength conversion, which includes an excitation light source and a multiple wavelength conversion materials on a moving plate. By using Etendue conserved focusing optics, multicolor light having high power and high brightness is obtained. The illumination device may be used for image projection systems.

An object of the present invention is to provide a high power and high brightness multicolor illumination device.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides an illumination device for providing multicolor light, which includes: a light source for generating an excitation light; and a moving plate including two or more segments, wherein one or more of the segments each contains a wavelength conversion material capable of absorbing the excitation light and emitting light having wavelengths different from that of the excitation light, wherein a first segment contains a first wavelength conversion material, and a second segment either contains a different wavelength conversion material or contains no wavelength conversion material, wherein a part of the moving plate is disposed on an optical path of the excitation light, and wherein the moving plate is supported to move so that different segments are exposed to the excitation light at different times. The illumination device may optionally include focusing optics and coupling optics disposed between the light source and the moving plate, a dichroic filter disposed between the wavelength conversion material and the light source, an angle-selective reflecting layer located adjacent the wavelength conversion material on a side opposite to the light source, a reflector cup with an exit aperture disposed adjacent the wavelength conversion material, and/or a reflective polarizer and a waveplate disposed adjacent the wavelength conversion material.

In another aspect, the present invention provides a method for generating multicolor light, which includes: generating an excitation light using a light source; directing the excitation light onto a segment of a moving plate, the moving plate having two or more segments, wherein one or more of the segments each contains a wavelength conversion material capable of absorbing the excitation light and emitting light having wavelengths different from that of the excitation light, wherein a first segment contains a first wavelength conversion material, and a second segment either contains a different wavelength conversion material or contains no wavelength conversion material; and moving the moving plate so that different segments are exposed to the excitation light at different times to generate emitted light of different colors.

It is to be understood that both the foregoing general description and the following detailed description are exemplary and explanatory and are intended to provide further explanation of the invention as claimed.

DETAILED DESCRIPTION OF THE PREFERRED EMBODIMENTS

Embodiments of the present invention provide a multi-color illumination device using an excitation light source and a multi-segmented moving plate with wavelength conversion materials, i.e., a plate having segments each containing a different wavelength conversion material (or no wavelength conversion material), where the plate is supported to move so that different segments are exposed to the excitation light at different times. The movement may be a rotation or a linear oscillation. When the moving plate moves, light of different colors is generated sequentially in time by the different wavelength conversion materials in different segments of the moving plate. The illumination device also includes focusing optics and a dichroic filter that passes shorter wavelength light and reflects longer wavelength light. Other components such as an angle-selective reflecting layer, a reflective polarizer and a waveplate, etc., may also be provided. The exciting light source may be a light emitting diode (LED) or a laser diode (LD) emitting in the UV and/or blue region (for example, 360 nm, 405 nm and 420 nm, or combinations thereof). The wavelength conversion materials are preferably phosphorescent materials, including phosphors and nano-materials such as quantum dots. Fluorescent materials may also be used as wavelength conversion materials, but they may not be suitable for certain applications such as projectors that require a relatively fast emission response. The absorption spectrum of the conversion material preferably covers the wavelengths of the excitation light. The emission wavelength of the conversion material may be broad (e.g., a broad range or the whole visible range) or narrow (single color, such as red, blue and green). Different phosphors with different emission spectra may be provided on the plate.

Figure 1:
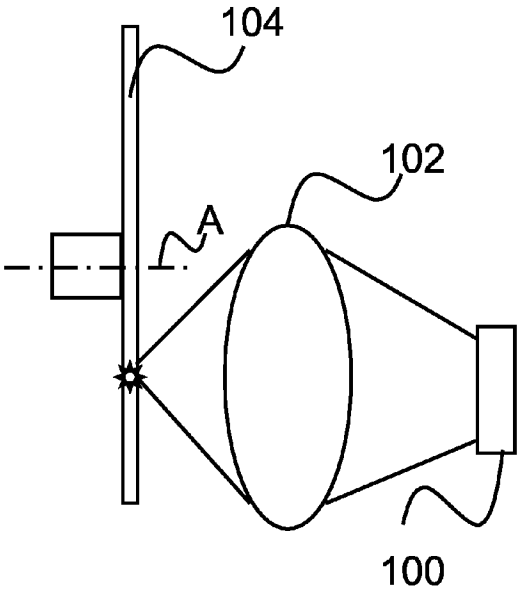
FIG. 1 is a schematic view of an illumination device according to an embodiment of the present invention.
Figure 2:
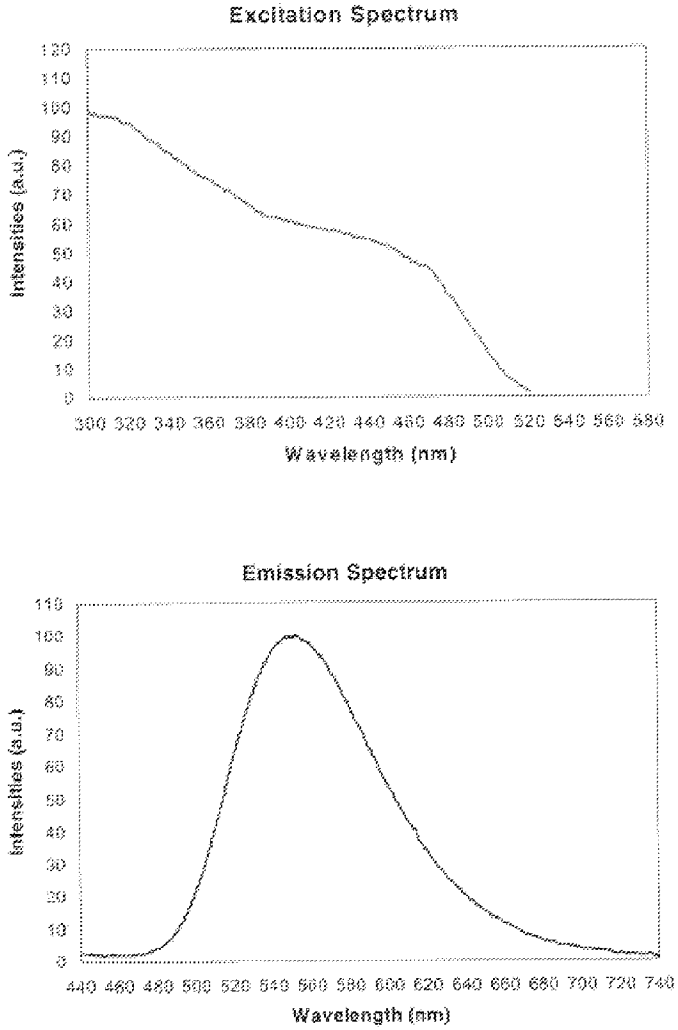
FIG. 2 shows exemplary excitation and emission spectra for a wavelength conversion material.

With reference to FIG. 1, an illumination device according to an embodiment of the presented invention comprises a light source 100, focus optics 102, and a rotary wheel with wavelength conversion materials 104. The wheel 104 is formed of optical transparent materials, such as glass, plastic such PMMA, etc. The wavelength conversion materials may be deposited on a surface of the wheel, or doped into the material that forms the wheel. The rotary wheel 104 is supported to rotate around its axis A. Excitation light from the light source 100 is focused by the focus optics 102 on to a small area of the rotary wheel 104. FIG. 2 illustrates the excitation spectrum and emission spectrum of an exemplary wavelength conversion material that may be provided on the rotary wheel 104. The wavelength conversion material absorbs excitation light at one wavelength range and emits light at a different wavelength range. Typically, the wavelength range of the emitted light is longer than the wavelength range of the excitation light. The excitation light from the light source 100 excites the wavelength conversion materials on the rotary wheel 104 and the wavelength conversion materials emit light at a different wavelength range than the light emitted from the light source 100.

The light source 100 may be regular lamps, or solid-state light source including laser and light emitting diodes (LED). For solid-state light sources, the wavelength of the light typically ranges from 300 nm to 500 nm. Fox example, many LED manufacturers produce light emitting diodes emitting at 460 nm (so called Blue LED). Cree Inc. produces deep blue LEDs near 400 nm. Nichia Co. produces UV LEDs near 365 nm. Laser manufacturers such as Sharp and Nichia produce lasers emitting near 405 nm. One major advantage of solid-state light sources over conventional lamps including mercury lamp is the modulation capability. Both lasers and LEDs can be modulated at a frequency higher than one mega Hertz.

Figure 3B:
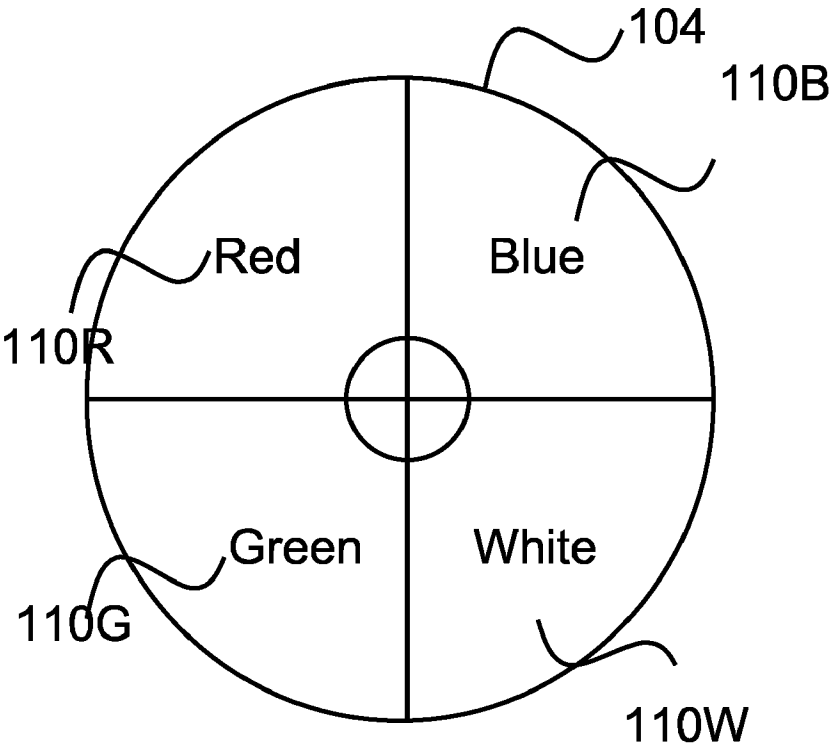
FIGS. 3a and 3b are schematic views of a rotary wheel with wavelength conversion material used in the embodiment shown in FIG. 1.
Figure 3A:
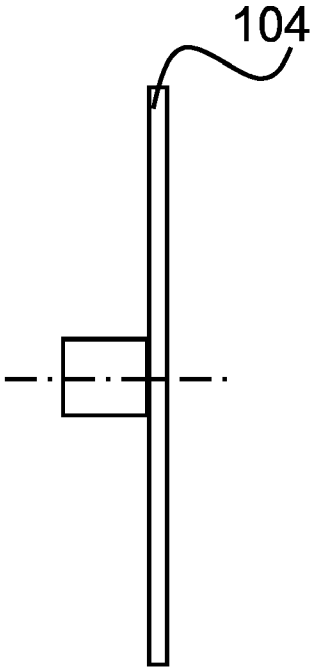

FIGS. 3a and 3b (side view and plan view, respectively) illustrate an exemplary configuration of the rotary wheel 104. The rotary wheel 104 has a round shape divided into two or more segments each containing a wavelength conversion material. In the illustrated example, there are four segments: Red, Green, Blue and White. The Red, Green, and Blue segments have wavelength conversion materials 110R, 110G, and 110B, respectively. Wavelength conversion materials 110R, 110G, and 110B preferably emit light at wavelength from 580 nm to 700 nm, 500 nm to 580 nm, and 400 nm to 500 nm, respectively. The white segment has a wavelength conversion material 110W emitting light from 480 nm to 700 nm and can partially pass the shorter wavelength of Blue light ranging from 400 nm to 500 nm, which results in combined white light. When the rotary wheel 104 rotates around its axis, the area of the wheel that receives the excitation light changes, for example, from Red to Green to White and to Blue segments, and different color light is emitted as a result. The rate of color change of the emitted light is directly related to the wheel rotation speed.

The rotary wheel configuration of FIG. 3 may have alternative implementations. For example, when the light source 100 emits blue light, the Blue segment may simply be a transparent material without a blue wavelength conversion material. The plate may be divided into as few as two segments containing two different wavelength conversion materials, or two segments one containing a wavelength conversion materials and one contains none, to form a two-color illumination source. The plate may be divided into more segments, for example, eight segments containing Red, Green, White, Blue, Red, Green, White and Blue wavelength conversion materials, respectively. The angular sizes of the segments may be equal or non-equal. When the angular sizes are non-equal, the relative duration of emission of each color is determined by the angular size of the segments assuming a uniform rotation.

Figure 4:
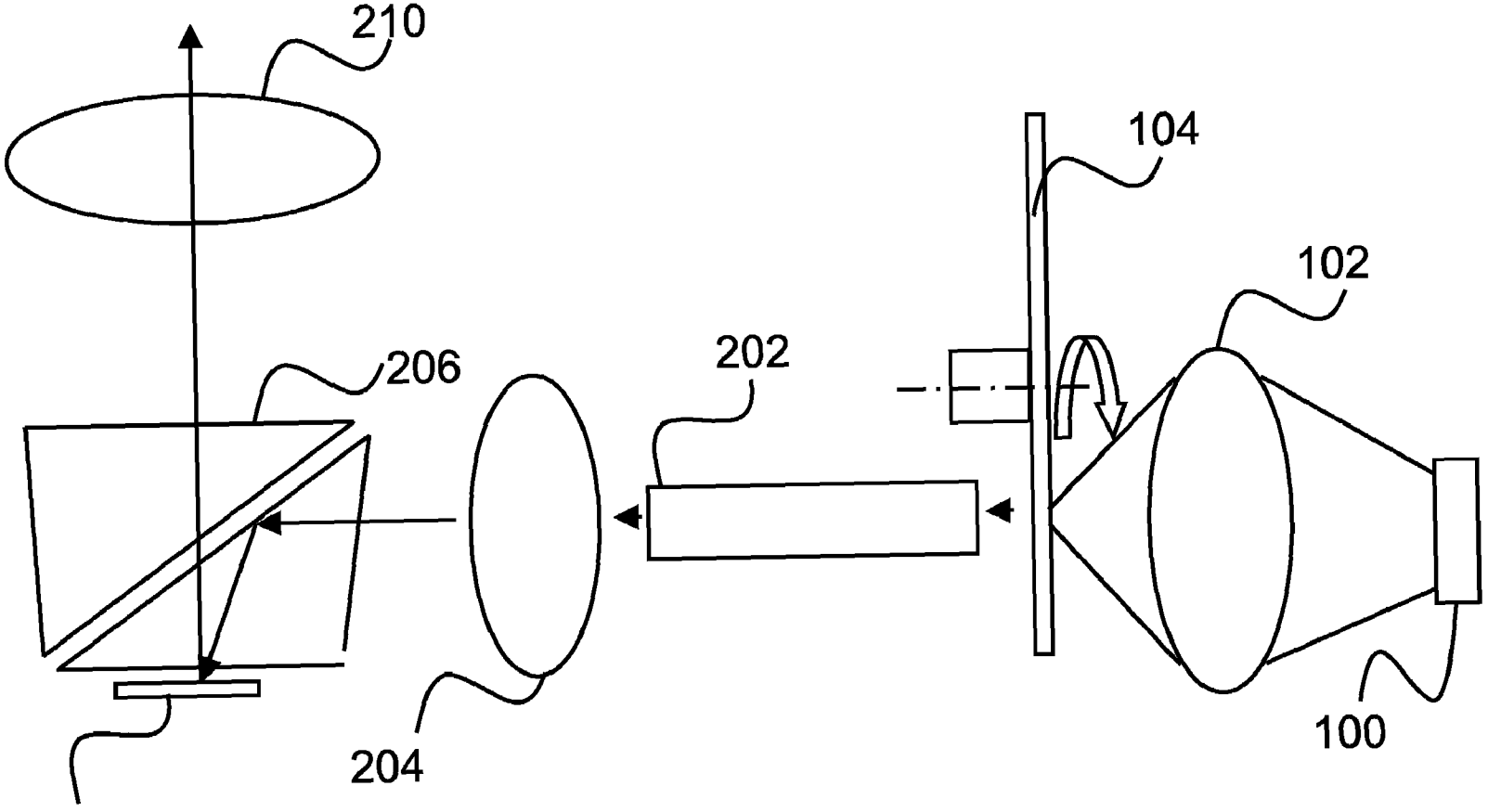
FIG. 4 is a schematic view of a projection system using the illumination device of FIG. 1.

FIG. 4 illustrates an application of a light source according to an embodiment of this invention. A projection system comprises light source 100, focusing optics 102, rotary wheel with wavelength conversion materials 104, light integrator 202, relay optics or collecting optics 204, prism 206, microdisplay imager 208, and projection lens 210. Light from light source 100 becomes multi-color lights after passing through the rotary wheel 104, and then passes through the light integrator 202 for intensity homogenization (scrambling). The relay optics 204 focuses the scrambled light through the prism 206 onto the microdisplay imager 208. The light modulated by the microdisplay imager 208 is projected to a display screen by projection lens 210. Multi-color images are obtained through synchronization between the microdisplay imager 208 and the rotary wheel 104 (the signal processor that controls the rotary wheel 104 and the microdisplay imager 208 is not shown).

Figure 5:
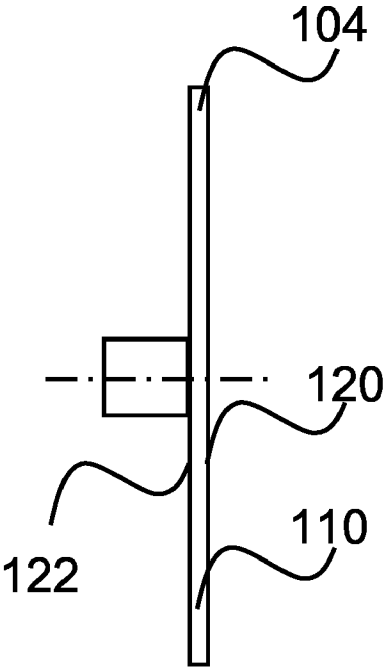
FIG. 5 is a schematic view of a rotary wheel according to another embodiment of the present invention.
Figure 6A:
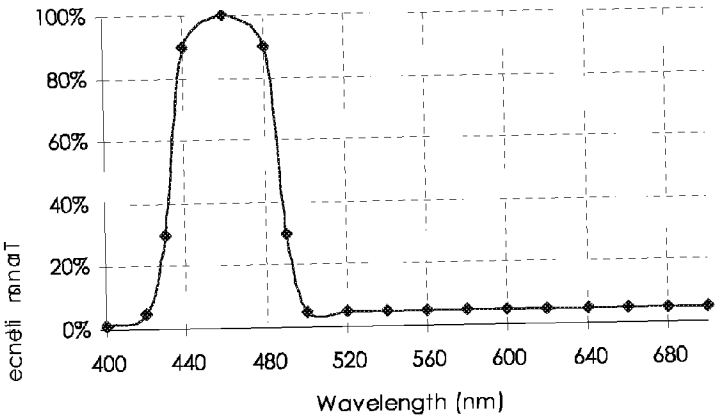
FIG. 6a is an example of spectral characteristics of a band-pass coating.
Figure 6B:
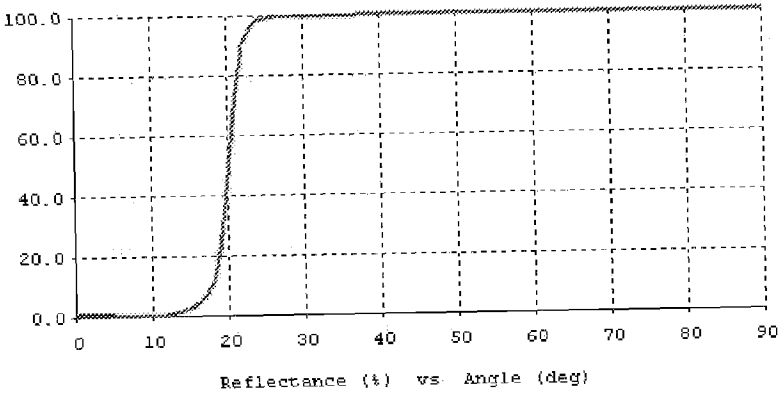
FIG. 6b is an example of angular characteristics of an angle-selective reflecting coating.

FIG. 5 illustrates a rotary wheel 104 according to another embodiment of the present invention. The rotary wheel 104 includes a wavelength conversion material 110, a band-pass coating 120 on a surface of the wheel on side facing the light source, and an angle-selective reflective coating 122 on the other surface of the wheel. FIG. 6a illustrates the optic property of an exemplary band-pass coating 120. The band-pass coating 120 (also referred to as a dichroic filter) allows light of specified wavelengths to pass through and reflect light of all other wavelengths. In FIG. 6a, blue light from 460 nm to 480 nm can pass through the coating and light from wavelength 500 nm to 680 nm is reflected. The dichroic filter 120 may also be located at other locations of the optical path, such as before the focusing optics 102. FIG. 6b illustrates the optic property of an exemplary angle-selective reflective coating 122. The angle-selective reflective coating 122 substantially reflects light at incident angles greater than a specified angle and substantially transmits light at smaller incident angles. In FIG. 6b, the light at incident angles less than 15 degree is transmitted through the coating 122 and light at incident angles greater than 25 degree is reflected.

Figure 7:
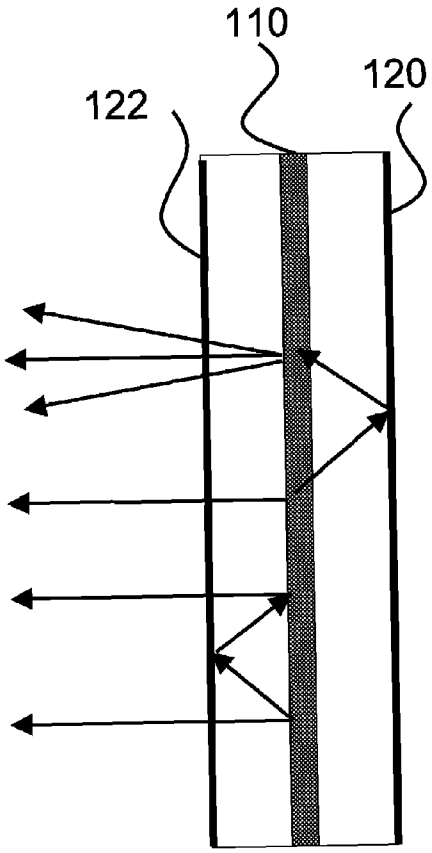
FIG. 7 illustrates how light travels within a section of the rotary wheel in the embodiment of FIG. 5.

FIG. 7 illustrates how the light emitted from wavelength conversion material 110 propagates out of the rotary wheel 104. The excitation light, for example blue light at 460 nm, is transmitted through the band-pass coating 120 and excites the wavelength conversion materials 110. The wavelength conversion materials 110 emit light at longer wavelengths, for example 550 nm. The light emitted at smaller incidence angles with respect to angle-selective reflective coating 122 will be transmitted through the coating 122. The light emitted at larger incidence angles will be reflected by the coating 122 back to the wavelength conversion materials 110 and scattered there. Some of the scattered light is at smaller incident angles and will pass through the angle-selective reflective coating 122. Other large angle light will be reflected by the coating 122 and scattered in the wavelength conversion material 110 again. The band-pass coating 120 will block the emitted light from transmitting backwards towards the excitation light source 100. The combination of the band-pass coating 120 and the angle-selective coating 122 will make the emission light propagate in one direction at small incidence angle. As a result, higher brightness of the emitted light is obtained.

Figure 8B:
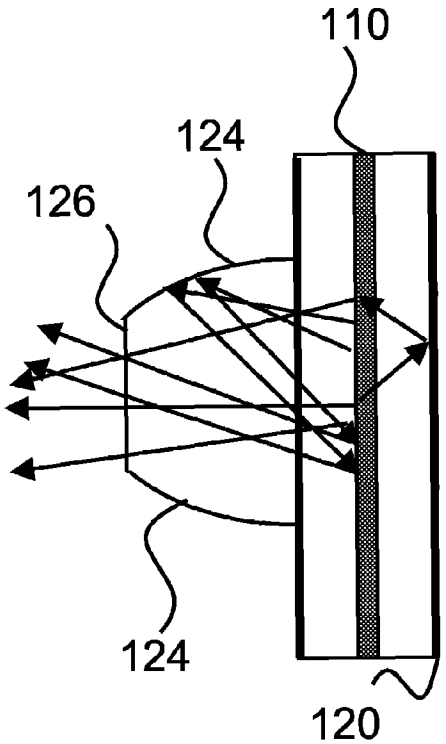
FIGS. 8a and 8b are schematic views of an alternative embodiment of the present invention.
Figure 8A:
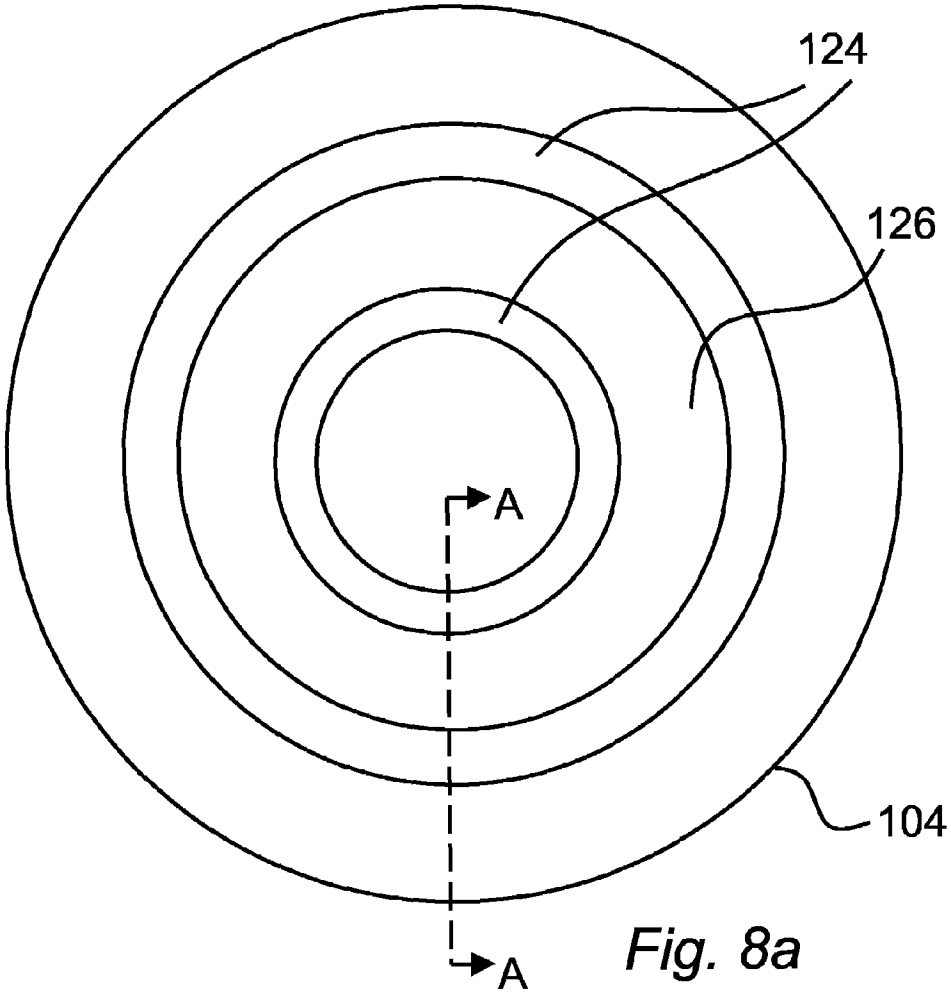

FIGS. 8a (plan view) and 8b (partial cross-sectional view along the line A-A in FIG. 8a) illustrate another embodiment of this invention. A ring-shaped reflector cup 124 with an exit aperture 126 covers the wavelength conversion material 110. Since the exit aperture is smaller than the light emitting area of the wavelength conversion material, light emitted by the wavelength conversion material at large incident angles will be reflected by the sidewall of the reflector cup 124 back to the wavelength conversion material 110 where it is scattered. Light emitted by the wavelength conversion material 110 that propagates at smaller incidence angles can escape out of the exit aperture 126. As a result, higher brightness of the emitted light is obtained.

Figure 9:
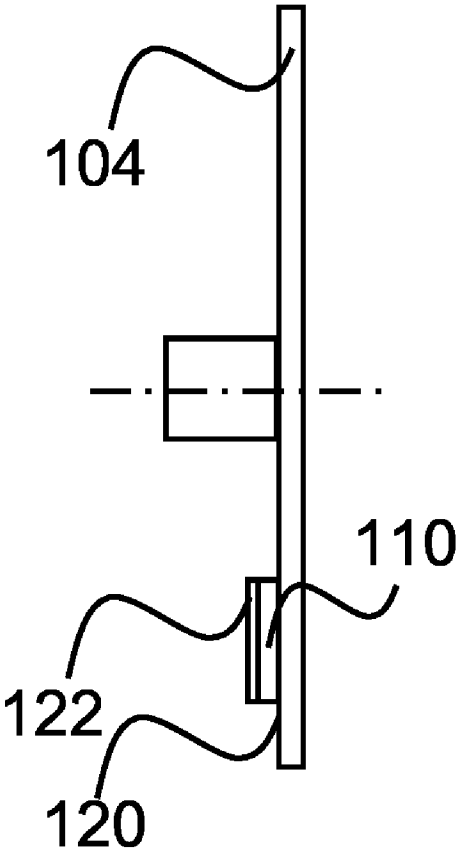
FIG. 9 is a schematic view of an alternative embodiment of the present invention.

FIG. 9 illustrates another embodiment of this invention. One side surface of the rotary wheel 104 is covered with a band-pass coating 120. A wavelength conversion material 110 and an angle-selective reflective coating 122 are attached to the rotary wheel 104. The wavelength conversion material 110 and the angle-selective reflective coating 122 have smaller area than the area of the wheel. As a result, the cost of the device shown in FIG. 9 can be lower than the cost of the device shown in FIG. 5.

Figure 10:
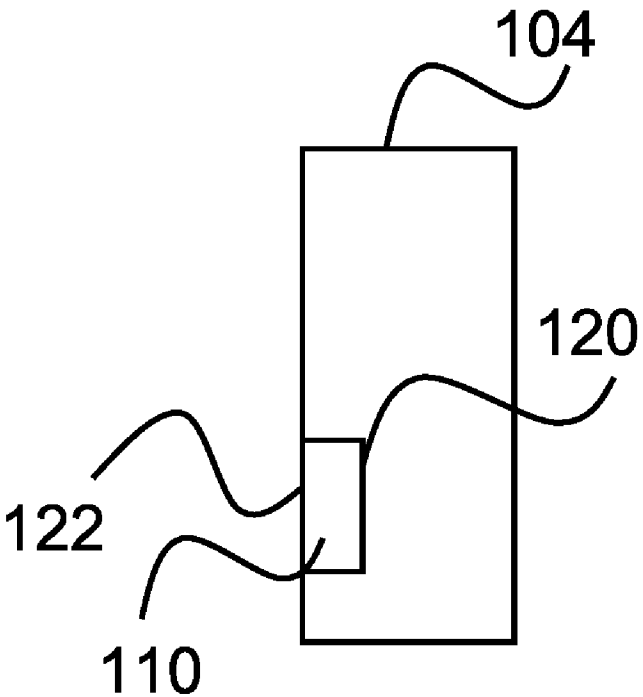
FIG. 10 is a schematic view of an alternative embodiment of the present invention.

FIG. 10 illustrates another embodiment of this invention. A grove is provided inside the rotary wheel 104 (a cross-sectional view or a portion of the wheel 104 is shown here), and the wavelength conversion materials 110 are located in the grove. An angle-selective reflective coating 122 and a band-pass coating 120 are provided on both sides of the wavelength conversion materials 110.

Figure 11B:
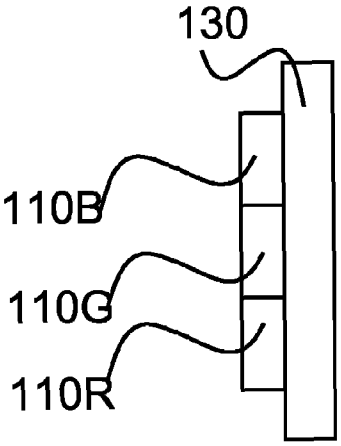
FIGS. 11a and 11b are schematic views of an alternative embodiment of the invention using a moving plate with wavelength conversion materials.
Figure 11A:
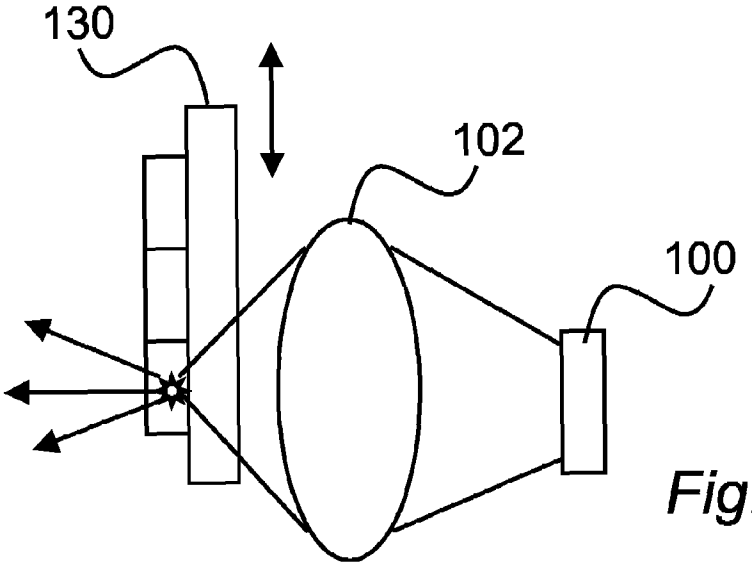

FIGS. 11a and 11b illustrate another embodiment of this invention. A rectangular moving plate 130 replaces the rotary wheel 104 in the embodiment shown in FIG. 1. Multi-color wavelength conversion materials such as a red wavelength conversion material 110R, a green wavelength conversion material 110G, and a blue wavelength conversion material 110B are arranged linearly on the moving plate 130. Excitation light from the light source 100 is focused by the focusing optics 102 on to the wavelength conversion materials of the moving plate 130. When the moving plate 130 oscillates linearly (as indicated by the arrows in FIG. 11a), the wavelength conversion materials 110R, 110G, and 110B are excited alternately and alternating color emission light is generated.

Figure 12:
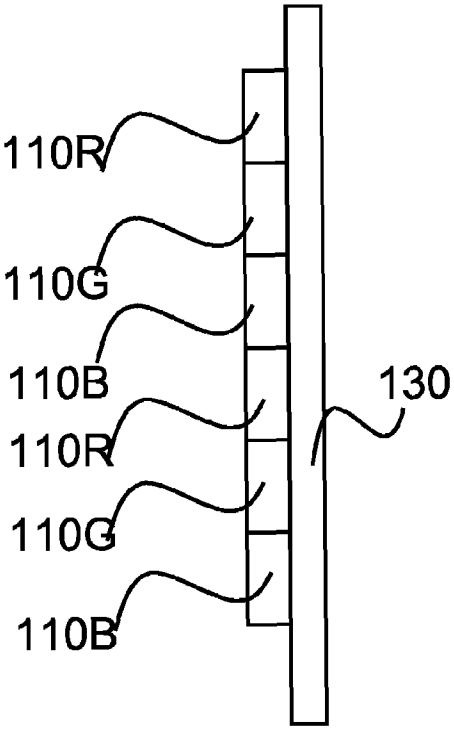
FIG. 12 is a schematic view of a variation of the moving plate shown in FIG. 11b.

FIG. 12 illustrates a variation of the moving plate 130 shown in FIG. 11b. To increase the color alternation frequency of the light emission, multiple sets of wavelength conversion materials 110R, 110G and 110B are provided on the moving plate 130 (two sets are shown here). The light alternation frequency will be the product of the oscillation frequency of the moving plate and the number of sets of the wavelength conversion material. As a result, higher color alternation frequency can be obtained or the requirement of the oscillation frequency of the moving plate 130 can be reduced.

Figure 13B:
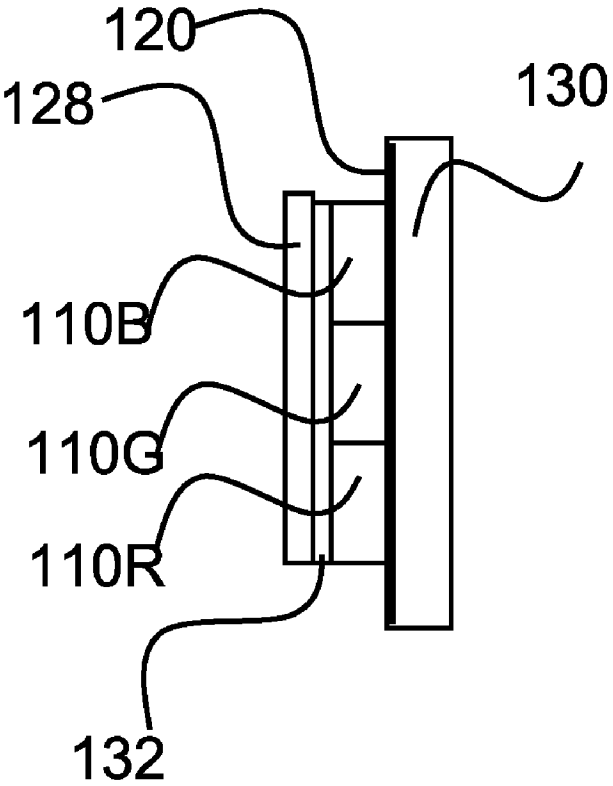
FIGS. 13a and 13b are schematic views of an alternative embodiment of the present invention.
Figure 13A:
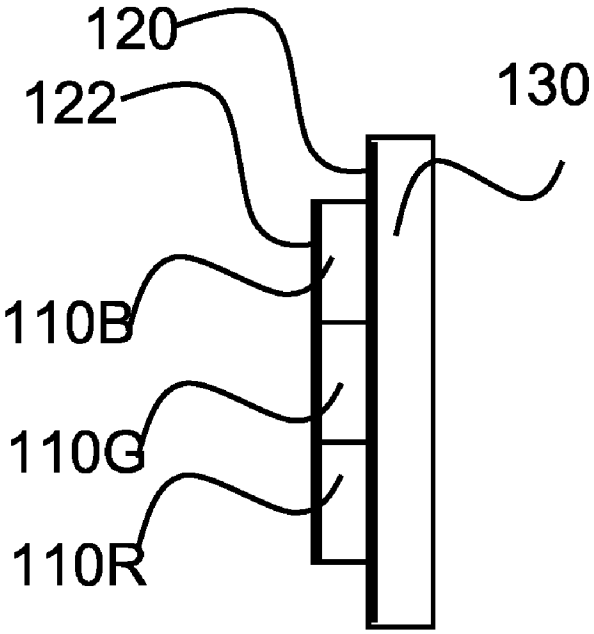

FIGS. 13a and 13b illustrate two alternative embodiments of the device shown in FIGS. 11a and 11b. In FIG. 13a, a band-pass coating 120 that only transmits excitation light from the light source 100 is located on the moving plate 130 facing light source. An angle-selective reflective coating 122 is located adjacent the wavelength conversion layers 110R, 110G, and 110B. As a result, only emitted light from the wavelength conversion material with smaller incident angles with respect to the moving plate 130 can exit the angle-selective reflective coating 122 and the brightness of the emitted light is increased. In FIG. 13b, a reflective polarizer 128 is located adjacent the wavelength conversion layer 110R, 110G, and 110B. The reflective polarizer 128 only transmits emitted light from the wavelength conversion materials in one polarization state and reflects the emitted light in the orthogonal polarization state back to the wavelength conversion layers 110R, 110G and 110B. The reflected light is scattered by the wavelength conversion material and typically changes their polarization state. Some of the light will be bounced back to the reflective polarizer 128 and pass through it since their polarization state is changed. As a result, the brightness in that polarization state, which is determined by the reflective polarizer 128, is increased. To enhance the efficiency in the polarization change, a phase retardation plate 132 can be inserted between reflective polarizer 128 and the wavelength conversion layers 110R, 110G and 110B. The phase retardation plate may be a quarter-wave waveplate.

Figure 14B:
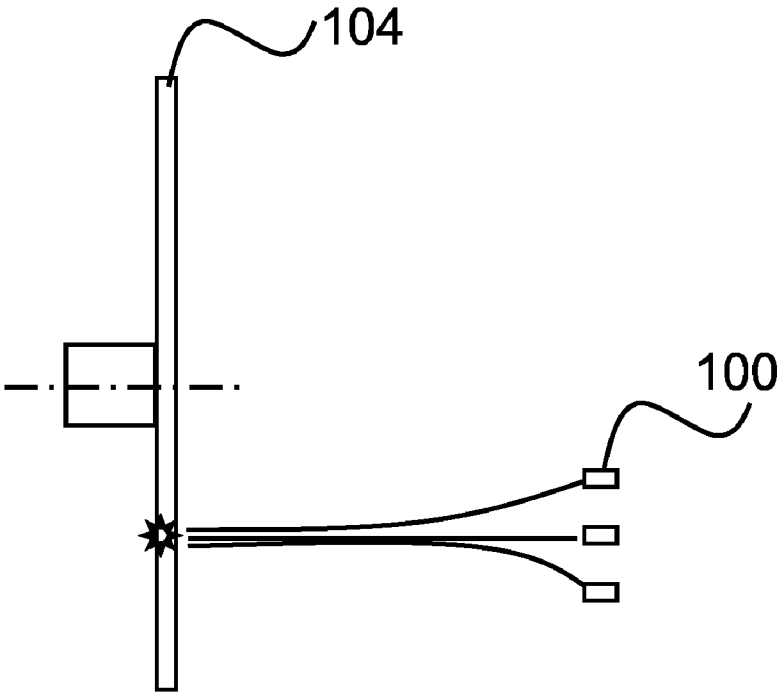
FIGS. 14a and 14b are schematic views of alternative embodiments of the present invention using multiple light sources.
Figure 14A:
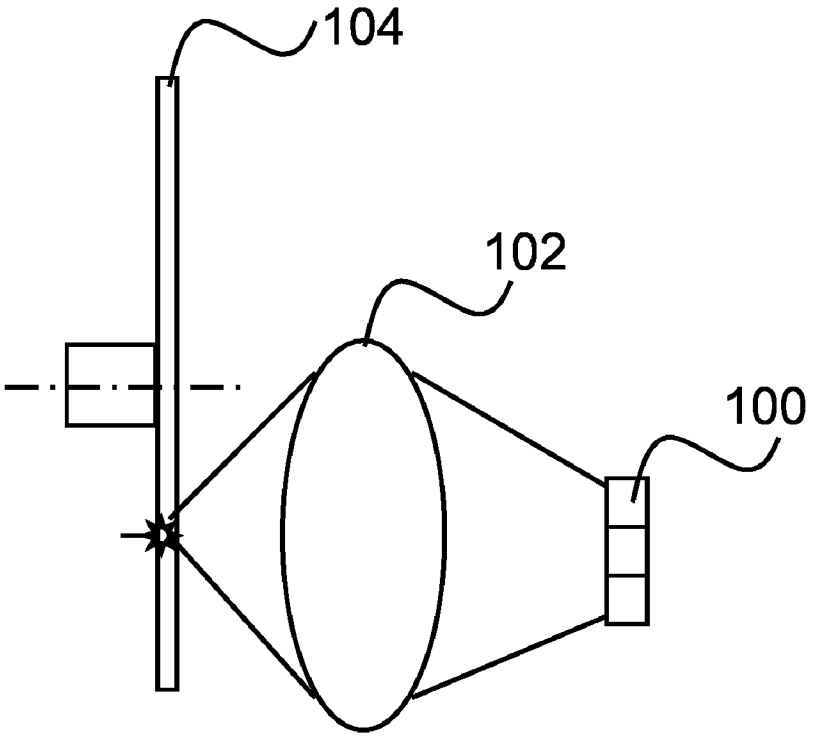
Figure 15A:
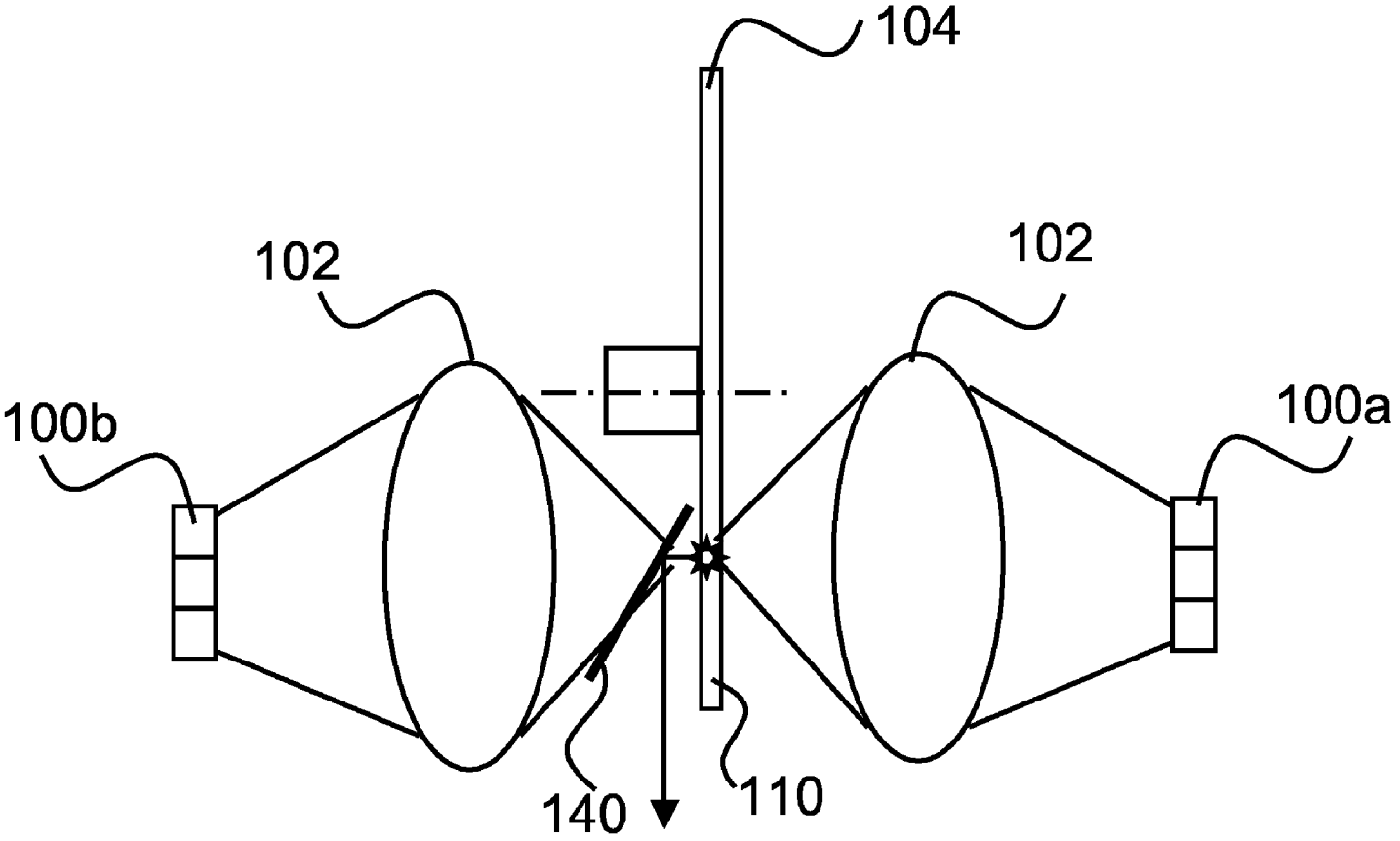
FIG. 15 is a schematic view of an alternative embodiment of the present invention using light sources at multiple wavelengths.

FIGS. 14a and 14b illustrate another embodiment of this invention. To increase the excitation energy from the light source 100, multiple solid-state light sources can be employed. For example, a densely packaged laser array or LED array can be configured for use as the light source 100 as shown in FIG. 14a. Besides an array format, light from multiple lasers and LEDs can be combined through an optic fiber bundle or a fiber coupler as schematically illustrated in FIG. 14b FIG. 15a illustrates another embodiment of this invention. To increase the excitation energy from the light source, multiple light sources emitting at different wavelengths can be employed. In the illustrated embodiment, two light sources 100a and 100b emitting at a first and a second wavelength are used to excite the wavelength conversion material 110 on the rotary wheel 104. Excitation light from the light source 100a excites the wavelength conversion material 110 from the backside of rotary wheel 104. Excitation light from the light source 100b is transmitted through a dichroic plate 140. The dichroic plate 140 transmits light at the second wavelength and reflects light at other wavelengths. As a result, the light emitted from the wavelength conversion material 110 is reflected by the dichroic plate 140. A specific example is given to further illustrate this embodiment. In this example, the light source 100a is a blue LED emitting light at 460 nm. The light source 100b is a UV laser emitting light at 405 nm. The excitation light from the light source 100a excites the wavelength conversion material 110 and produces red, green, blue and white light. The dichroic plate 140 is deposited with dielectric layers which only passes light below 425 nm and reflects light from 425 nm to 700 nm. The UV light from the light source 100b is transmitted through the dichroic plate 140 and excites the wavelength conversion material 110. The light from the wavelength conversion materials and light source 100a will be reflected by the dichroic plate 140.

Figure 15B:
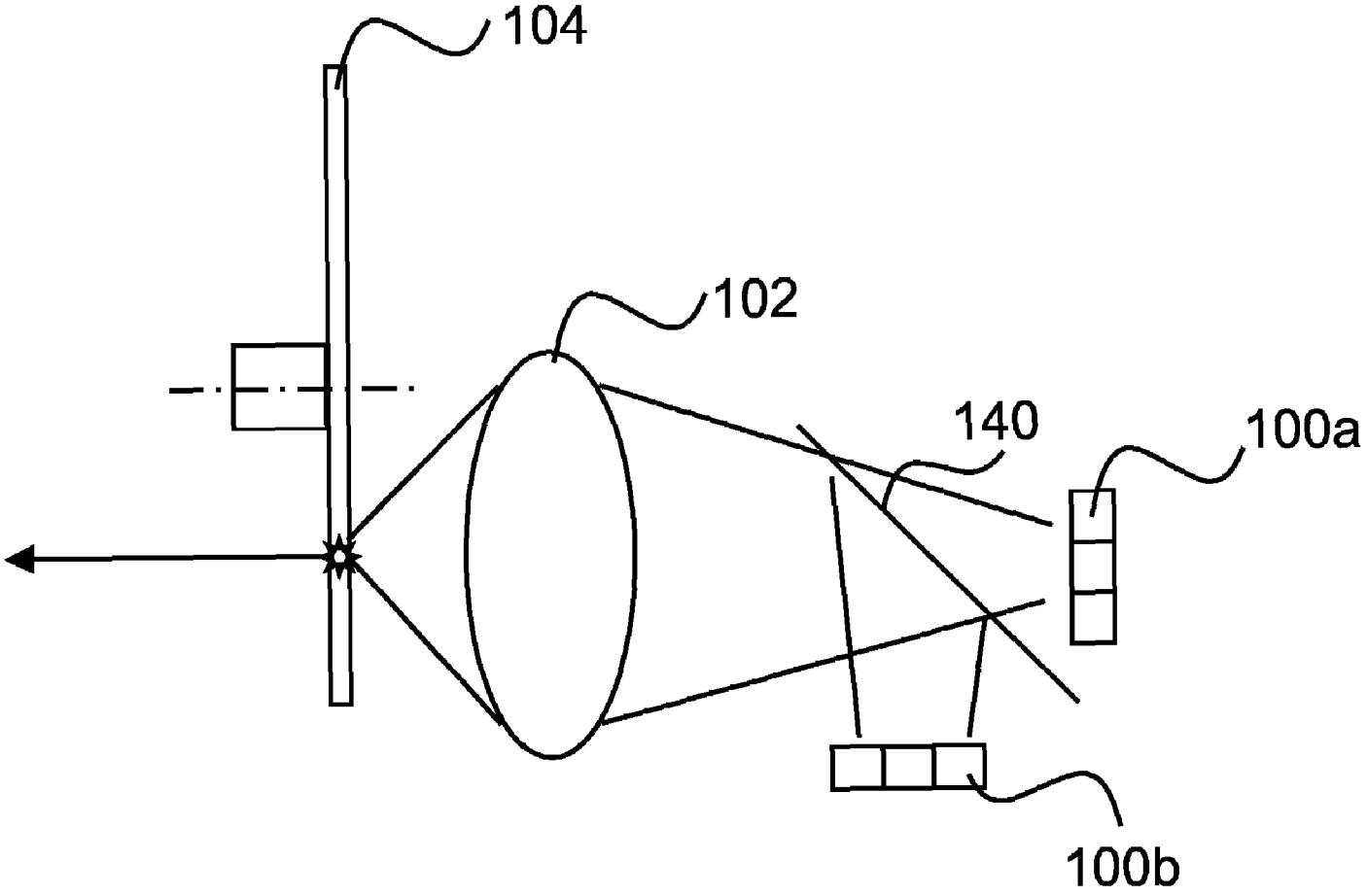

FIG. 15b illustrates another embodiment similar to that show in FIG. 15a but with all light sources 100a, 100b, etc. located on one side of the rotary wheel 104. A dichroic plate 140 is located between the sources 100a, 100b, etc. and the rotary wheel with wavelength conversion material 104 to combine the excitation light from the light sources 100a and 100b. The dichroic plate 140 transmits excitation light from the source 100a and reflects excitation light from the source 100b which has a different wavelength range from the source 100a. The combined light from the two sources 100a, 100b is directed to the wavelength conversion material on the rotary wheel 104.

Figure 16:
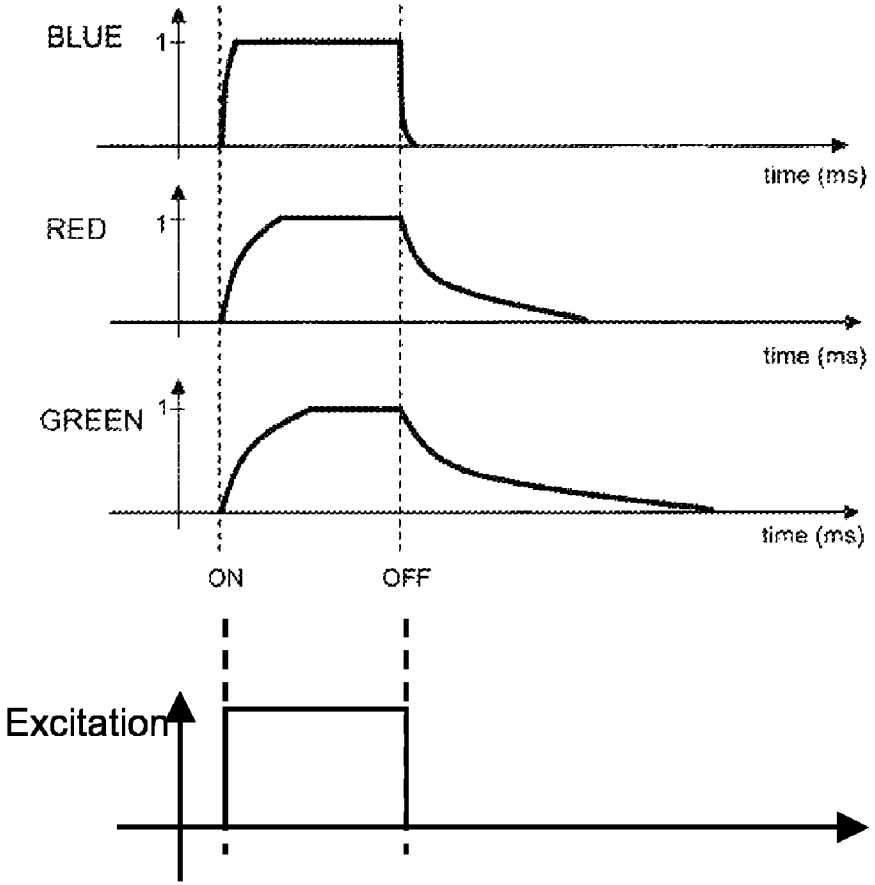
FIG. 16 show timing charts illustrating light intensity modulation according to another embodiment of the present invention.

FIG. 16 is a timing chart illustrating the principle of light intensity modulation according to another embodiment of this invention. To modulate the emission light intensity from the wavelength conversion material 110, a modulation scheme is applied to the excitation light source 100. Since the wavelength conversion materials can rapidly react to the excitation light, a modulated excitation light can lead to the intensity modulation of emission lights. Various modulation methods may be used. In the example illustrated in FIG. 16, the waveform of the excitation light is a rectangular wave and modulation may be accomplished by pulse width modulation. Alternatively, triangular waves, sinusoidal waves, or other waveforms may be used. In addition, different modulation schemes may be used for different excitation lights or to excite different wavelength conversion materials. For example, some of the wavelength conversion materials may require stronger excitation light than others.

Multicolor illumination devices according to embodiments of the present invention have many advantages. For example, light at various peak wavelengths can be easily obtained. One set of LD or LED excitation light sources with similar wavelength can be used. No color wavelength division multiplexer in the visible region is required. The output colors are not limited by the LD or LED chips. It also simplifies the image projection design. The peak wavelengths of the emitted light can be rapidly changed, and the intensity can be easily modulated. In addition, when appropriate focusing and collecting optics is used, the emitted light has a small Etendue. Such multicolor illumination devices may be useful in mini projectors.

It will be apparent to those skilled in the art that various modification and variations can be made in the multicolor illumination device of the present invention without departing from the spirit or scope of the invention. Thus, it is intended that the present invention cover modifications and variations that come within the scope of the appended claims and their equivalents.

What is claimed is:

[1. An illumination device for providing multicolor light, comprising:

a light source for generating an excitation light;

a plate including two or more segments, wherein one or more of the segments each contains a wavelength conversion material capable of absorbing the excitation light and emitting light having wavelengths different from that of the excitation light, wherein a first segment contains a first wavelength conversion material, and a second segment either contains a different wavelength conversion material or contains no wavelength conversion material, wherein a part of the plate is disposed on an optical path of the excitation light, and wherein the plate and the excitation light are moveable relative to each other so that different segments are exposed to the excitation light at different times; and a dichroic element disposed between the wavelength conversion material and the light source, the dichroic element transmitting the excitation light and reflecting light emitted by the wavelength conversion materials.]

[2. The illumination device of claim 1, wherein the light source is a solid-state light source.]

[3. The illumination device of claim 2, wherein the light source is a laser diode or a light emitting diode.]

[4. The illumination device of claim 2, wherein the light source includes multiple laser diodes, multiple light emitting diodes, or both laser diodes and light emitting diodes.]

[5. The illumination device of claim 4, further comprising:

an optic fiber coupler or an optic fiber bundle for combining light generated by the laser diodes or light emitting diodes or both.]

[6. The illumination device of claim 1, further comprising:

focusing optics disposed between the light source and the plate.]

[7. The illumination device of claim 1, wherein the plate is made of an optical transparent material.]

[8. The illumination device of claim 1, wherein the plate has a round shape and is divided by radial lines into the two or more segments, and wherein the plate is supported to rotate about an axis.]

[9. The illumination device of claim 1, wherein the plate includes two or more wavelength conversion materials.]

[10. The illumination device of claim 1, wherein the wavelength conversion materials include phosphors or quantum dots.]

[11. The illumination device of claim 1, wherein the wavelength conversion materials are doped into a material that forms the plate.]

[12. The illumination device of claim 1, wherein the wavelength conversion materials are formed on a surface of the plate.]

[13. The illumination device of claim 1, wherein the wavelength conversion materials are attached to a surface of the plate.]

[14. The illumination device of claim 1, wherein the plate defines a groove and the wavelength conversion materials are located in the groove.]

[15. The illumination device of claim 1, wherein the dichroic filter is a band-pass coating on the plate facing the light source.]

[16. The illumination device of claim 1, further comprising:

an angle-selective reflecting layer located adjacent the wavelength conversion material on a side opposite to the light source, the angle-selective reflecting layer substantially transmitting light having an incident angle smaller than a predefined angle and substantially reflecting light having an incident angle larger than the predefined angle.]

[17. The illumination device of claim 1, further comprising:

a reflector cup with an exit aperture disposed adjacent the wavelength conversion material, the exit aperture having an area smaller than an emission area of the wavelength conversion material.]

[18. The illumination device of claim 1, wherein the segments of the plate are arranged linearly and the plate oscillates linearly.]

[19. The illumination device of claim 18, wherein the plate includes repeating sets of multiple wavelength conversion materials.]

[20. The illumination device of claim 1, further comprising:

a reflective polarizer disposed adjacent the wavelength conversion material, the reflective polarizer transmitting light in one polarization state and reflecting light in another polarization state.]

[21. The illumination device of claim 20, further comprising:

a waveplate located between the reflective polarizer and the wavelength conversion layer.]

[22. The illumination device of claim 21, wherein the waveplate is a quarter-wave waveplate.]

[23. The illumination device of claim 1, wherein the light source includes a plurality of sources emitting at different wavelengths.]

[24. The illumination device of claim 23, wherein a first and a second source are located on one side of the plate, the device further comprising:

a dichroic plate located between the sources and the wavelength conversion material to combine excitation light from the first and second sources, the dichroic plate transmitting the excitation light from the first source in one wavelength range and reflecting the excitation light from the second source in other wavelength range.]

25. [The] *An* illumination device [of claim 23] *for providing multicolor light*, [wherein a first and a second source are located on both side of the plate, the device further] comprising:

*a light source for generating an excitation light, wherein the light source includes at least first and second sources emitting at different wavelengths;*

*a plate including two or more segments, wherein one or more of the two or more segments each contains a wavelength conversion material capable of absorbing the excitation light and emitting light having wavelengths different from that of the excitation light, wherein a first segment of the plate contains a first wavelength conversion material, and a second segment of the plate either contains a different wavelength conversion material or contains no wavelength conversion material, wherein a part of the plate is disposed on an optical path of the excitation light, wherein the first and second sources are located on opposite sides of the plate, and wherein the plate and the excitation light are moveable relative to each other so that different segments of the plate are exposed to the excitation light at different times;*

*a dichroic element disposed between the wavelength conversion materials and the light source, the dichroic element transmitting the excitation light and reflecting light emitted by the wavelength conversion materials; and* a dichroic plate located between the second source and the wavelength conversion materials, the dichroic plate transmitting excitation light from the second source in one wavelength range and reflecting light emitted by the wavelength conversion material.

[26. The illumination device if claim 1, wherein the light source is driven by a pulse width modulated signal.]

[27. A method for generating multicolor light, comprising:

generating an excitation light using a light source;

directing the excitation light onto a segment of a plate, the plate having two or more segments, wherein one or more of the segments each contains a wavelength conversion material capable of absorbing the excitation light and emitting light having wavelengths different from that of the excitation light, wherein a first segment contains a first wavelength conversion material, and a second segment either contains a different wavelength conversion material or contains no wavelength conversion material, the plate further including a dichroic filter disposed between the wavelength conversion material and the light source, the dichroic filter transmitting the excitation light and reflecting light emitted by the wavelength conversion materials; and moving the plate and the excitation light relative to each other so that different segments are exposed to the excitation light at different times to generate emitted light of different colors.]

[28. The method of claim 27, wherein the light source is a laser diode or a light emitting diode.]

[29. The method of claim 27, wherein the wavelength conversion materials include phosphors or quantum dots.]

[30. The method of claim 27, wherein the plate further comprises an angle-selective reflecting layer located adjacent the wavelength conversion material on a side opposite to the light source, the angle-selective reflecting layer substantially transmitting light having an incident angle smaller than a predefined angle and substantially reflecting light having an incident angle larger than the predefined angle.]

[31. A method for generating multicolor light, comprising:

generating an excitation light using a light source;

directing the excitation light onto a segment of a plate, the plate having two or more segments, wherein one or more of the segments each contains a wavelength conversion material capable of absorbing the excitation light and emitting light having wavelengths different from that of the excitation light, wherein a first segment contains a first wavelength conversion material, and a second segment either contains a different wavelength conversion material or contains no wavelength conversion material;

moving the plate and the excitation light relative to each other so that different segments are exposed to the excitation light at different times to generate emitted light of different colors;

projecting the light of different colors emitted from the wavelength conversion materials toward a display screen using a microdisplay imager;

modulating the light source;

controlling the relative movement of the plate and the light source, the microdisplay imager, and the modulation of the light source in a synchronized manner to generate an image on the display screen.]

[32. A method for generating a colored light, comprising:

generating an excitation light using a light source;

directing the excitation light onto a segment of a plate, the plate having two or more segments, wherein one or more of the segments each contains a wavelength conversion material capable of absorbing the excitation light and emitting light having wavelengths different from that of the excitation light, wherein a first segment contains a first wavelength conversion material, and a second segment either contains a different wavelength conversion material or contains no wavelength conversion material;

moving the plate and the excitation light relative to each other so that different segments are exposed to the excitation light at different times to generate emitted light of different colors;

modulating the light source; and controlling the relative movement of the plate and the excitation light and the modulation of the light source in a synchronized manner to generate a colored light.]

[33. An illumination device for providing multicolor light, comprising:

one or more light sources each for generating an excitation light;

one or more optic fibers for transmitting the excitation light generated by the one or more light sources;

a plate including two or more segments, wherein one or more of the segments each contains a wavelength conversion material capable of absorbing the excitation light and emitting light having wavelengths different from that of the excitation light, wherein a first segment contains a first wavelength conversion material, and a second segment either contains a different wavelength conversion material or contains no wavelength conversion material, wherein a part of the plate is disposed on an optical path of the excitation light outputted by the optical fibers, and wherein the plate and the optical fibers are moveable relative to each other so that different segments are exposed to the excitation light at different times.]

*34. The illumination device of claim 25, wherein the first source and the second source are located on opposite sides of the plate.*

*35. An illumination device for providing multicolor light, comprising:*

*a light source for generating an excitation light in a blue region;*

*a plate including one or more segments each containing a wavelength conversion material capable of absorbing the excitation light and emitting light having wavelengths different from that of the excitation light, wherein the wavelength conversion material of the segments is doped into the plate, wherein a part of the plate is disposed on an optical path of the excitation light, and wherein the plate and the excitation light are moveable relative to each other so that the one or more segments are exposed to the excitation light at different times;*

*focusing optics disposed between the light source and the plate to focus the excitation light onto the plate; and*

*a dichroic element disposed between the wavelength conversion material and the light source, the dichroic element transmitting the excitation light and reflecting light emitted by the wavelength conversion material,*

*wherein a first segment of the plate contains a first wavelength conversion material which absorbs a first portion of the excitation light, emits a corresponding light having a first wavelength different from that of the excitation light, and transmits a second portion of the excitation light to produce a combined multi-color light of the corresponding light having the first wavelength and the second portion of the excitation light.*

*36. A method for generating multicolor light, comprising:*

*generating an excitation light in a blue region using a light source;*

*directing the excitation light onto a segment of a plate, the plate having two or more segments, including focusing the excitation light into a light spot on the plate, one or more segments of the plate each containing a wavelength conversion material capable of absorbing the excitation light and emitting light having wavelengths different from that of the excitation light,*

*wherein the wavelength conversion material of the one or more segments is doped into the plate, the plate further including a dichroic filter disposed between the wavelength conversion material and the light source, and the dichroic filter transmitting the excitation light and reflecting light emitted by the wavelength conversion materials; and*

*moving the plate and the excitation light relative to each other so that different segments of the plate are exposed*

*to the excitation light at different times to generate emitted light of different colors,*

*wherein a first segment of the plate contains a first wavelength conversion material which absorbs a first portion of the excitation light, emits a corresponding light having a first wavelength different from that of the excitation light, and transmits a second portion of the excitation light to produce a combined multi-color light of the corresponding light having the first wavelength and the second portion of the excitation light.*

*37. An illumination device for providing multicolor light, comprising:*

*a light source for generating an excitation light in a blue region, the light source including one or more laser diodes or light emitting diodes;*

*a plate including two or more segments, wherein one or more segments of the plate each contains a wavelength conversion material capable of absorbing the excitation light and emitting light having wavelengths different from that of the excitation light, wherein a first segment of the plate contains a first wavelength conversion material, and a second segment of the plate either contains a different wavelength conversion material which absorbs a portion of the excitation light and transmits a portion of the excitation light to produce a combined light or contains no wavelength conversion material, wherein a part of the plate is disposed on an optical path of the excitation light, wherein the plate and the excitation light are moveable relative to each other so that different segments are exposed to the excitation light at different times, and*

*wherein the wavelength conversion material of the one or more segments is doped into the plate;*

*focusing optics disposed between the light source and the plate to focus the excitation light into a light spot onto the plate, the light spot being larger than a size of the light source; and*

*a dichroic element disposed between the wavelength conversion material and the light source, the dichroic element transmitting the excitation light and reflecting light emitted by the wavelength conversion materials.*

*38. An illumination device for providing multicolor light, comprising:*

*a light source for generating an excitation light;*

*a plate including two or more segments,*

*wherein one or more segments of the plate each contains a wavelength conversion material capable of absorbing the excitation light and emitting light having wavelengths different from that of the excitation light,*

*wherein a first segment of the plate contains a first wavelength conversion material, and a second segment of the plate either contains a different wavelength conversion material or contains no wavelength conversion material,*

*wherein the wavelength conversion materials are doped into a material that forms the plate,*

*wherein a part of the plate is disposed on an optical path of the excitation light, and*

*wherein the plate and the excitation light are moveable relative to each other so that different segments of the plate are exposed to the excitation light at different times; and*

*a dichroic element disposed between the wavelength conversion material and the light source, the dichroic element transmitting the excitation light and reflecting light emitted by the wavelength conversion materials.*

*39. An illumination device for providing multicolor light, comprising:*

*a light source for generating an excitation light;*

*a plate including two or more segments,*

*wherein one or more segments of the plate each contains a wavelength conversion material capable of absorbing the excitation light and emitting light having wavelengths different from that of the excitation light,*

*wherein a first segment of the plate contains a first wavelength conversion material, and a second segment of the plate either contains a different wavelength conversion material or contains no wavelength conversion material,*

*wherein a part of the plate is disposed on an optical path of the excitation light,*

*wherein the plate and the excitation light are moveable relative to each other so that different segments of the plate are exposed to the excitation light at different times, and*

*wherein the plate defines a groove and the wavelength conversion materials are located in the groove; and*

*a dichroic element disposed between the wavelength conversion material and the light source, the dichroic element transmitting the excitation light and reflecting light emitted by the wavelength conversion materials.*

*40. An illumination device for providing multicolor light, comprising:*

*a light source for generating an excitation light, wherein the light source includes at least first and second sources emitting at different wavelengths;*

*a plate including two or more segments,*

*wherein one or more segments of the plate each contains a wavelength conversion material capable of absorbing the excitation light and emitting light having wavelengths different from that of the excitation light,*

*wherein a first segment of the plate contains a first wavelength conversion material, and a second segment of the plate either contains a different wavelength conversion material or contains no wavelength conversion material,*

*wherein a part of the plate is disposed on an optical path of the excitation light,*

*wherein the plate and the excitation light are moveable relative to each other so that different segments are exposed to the excitation light at different times, and*

*wherein the first source and the second source are located on one side of the plate;*

*a dichroic plate located between the sources and the wavelength conversion material to combine excitation light from the first and second sources, the dichroic plate transmitting the excitation light from the first source in one wavelength range and reflecting the excitation light from the second source in another wavelength range; and*

*a dichroic element disposed between the wavelength conversion material and the light source, the dichroic element transmitting the excitation light and reflecting light emitted by the wavelength conversion materials.*

*41. An illumination device for providing multicolor light, comprising:*

*one or more light sources each for generating an excitation light;*

*one or more optic fibers for transmitting the excitation light generated by the one or more light sources;*

*a plate including two or more segments,*

*wherein one or more segments of the plate each contains a wavelength conversion material capable of absorb-*

*ing the excitation light and emitting light having wavelengths different from that of the excitation light, wherein a first segment of the plate contains a first wavelength conversion material, and a second segment of the plate either contains a different wavelength conversion material or contains no wavelength conversion material, wherein the wavelength conversion material of the segments is doped into the plate, wherein a part of the plate is disposed on an optical path of the excitation light outputted by the optical fibers, and wherein the plate and the optical fibers are moveable relative to each other so that different segments of the plate are exposed to the excitation light at different times.*

* * * * *